United States Patent [19]
Ohmura et al.

[11] Patent Number: 5,239,324
[45] Date of Patent: Aug. 24, 1993

[54] UNDERWATER HOUSING AND AN UNDERWATER TAKING CAMERA

[75] Inventors: Hiroshi Ohmura; Katsuji Muramatsu, both of Tokyo, Japan

[73] Assignee: Fuji Photo Film Co., Ltd., Kanagawa, Japan

[21] Appl. No.: 830,878

[22] Filed: Feb. 4, 1992

[30] Foreign Application Priority Data

Feb. 4, 1991 [JP] Japan .................. 3-10592[U]
May 8, 1991 [JP] Japan .................. 3-41306[U]

[51] Int. Cl.$^5$ .................. G03B 17/08
[52] U.S. Cl. .................. 354/64
[58] Field of Search .................. 354/64

[56] References Cited

U.S. PATENT DOCUMENTS

| | | | |
|---|---|---|---|
| 3,019,715 | 2/1962 | Arnold et al. | 354/64 |
| 4,265,523 | 5/1981 | Defuans | 354/64 |
| 4,766,451 | 8/1988 | Fujimura et al. | 354/64 |
| 4,882,600 | 11/1989 | Van de Moere | 354/64 |
| 4,884,087 | 11/1989 | Mochida et al. | 354/64 |
| 4,954,857 | 9/1990 | Mochida et al. | 354/64 |
| 5,126,772 | 6/1992 | Albrecht | 354/64 |

FOREIGN PATENT DOCUMENTS

| | | |
|---|---|---|
| 1-128240 | 9/1989 | Japan . |
| 1-128241 | 9/1989 | Japan . |
| 2-32615 | 7/1990 | Japan . |
| 2-203329 | 8/1990 | Japan . |

*Primary Examiner*—Michael L. Gellner
*Assistant Examiner*—Jae N. Noh
*Attorney, Agent, or Firm*—Young & Thompson

[57] ABSTRACT

An underwater housing has a housing body of which a bottom is open and a lid is fitted to the bottom opening in watertight fashion. A manually operable dial is rotatably mounted on an upper side of the housing body in such a manner that a portion of the manually operable dial projects from a rear side of the housing body. A driving gear is formed on a lower side of the manually operable dial, and is in mesh with a driven gear. Within the housing body, a coupling gear is formed coaxially on the driven gear. When the manually operable dial is rotated in a first direction, the coupling gear is rotated in a second direction, and causes a wind-up dial of a camera to rotate in turn in the first direction, that is, in the same direction as the manually operable dial. The manually operable dial is prevented from rotating in the second direction by a reverse-rotation-preventing member.

42 Claims, 8 Drawing Sheets

UNDERWATER HOUSING AND AN UNDERWATER TAKING CAMERA

BACKGROUND OF THE INVENTION

1. Field of the Invention

The present invention relates to an underwater housing for a camera in which photographic film is wound up manually, and to the combination of such a housing with such a camera.

2. The Known Prior Art

A lens-fitted film unit or single-use camera is preloaded with photographic film before a user purchases it. After he takes photographs by use of the film unit, he does not need to unload the photographic film from the film unit. He can forward the film unit containing the exposed film to a photo laboratory where a photofinisher unloads the photographic film and performs photofinishing. Such convenience and simplicity in use is a characteristic feature of the film unit, which is sold commercially in a large scale.

For the purpose of using the film unit even underwater, there has been proposed an underwater housing for containing the film unit, as disclosed in Japanese Patent Laid-Open Publn. No. 2-203329. In such an underwater housing, there is mounted a manually operable dial on an upper side of a housing body for winding up the photographic film. The dial is provided with a coaxial gear, which is coupled directly with a film wind-up dial of the film unit. When the film unit is used without an underwater housing, the wind-up dial is rotated directly with the user's finger.

To wind up the photographic film while the film unit is contained in the above-described underwater housing, the dial on the housing needs to be manually rotated in the direction opposite to the direction of rotating the wind-up dial on the film unit. If the user is accustomed to using the film unit without the underwater housing, he might rotate the dial of the underwater housing in the wrong direction inadvertently. There is also a problem in that the dial on the housing projects largely rearwardly from the housing body, because the housing dial is coaxial with the coupling gear in mesh with the wind-up dial on the film unit. To reduce such rearward projection of the housing dial, it needs to have a small diameter. Such a small housing dial is, however, pinched between the user's fingers when it is rotated. This construction increases the force that must be applied by the user, so that the user cannot wind up the photographic film rapidly. Because such a small dial is awkward for the fingers to manipulate, there is the danger of applying excessive force to the housing dial and in turn to the film-advancing mechanism, so that this mechanism might be damaged.

Figure 10:
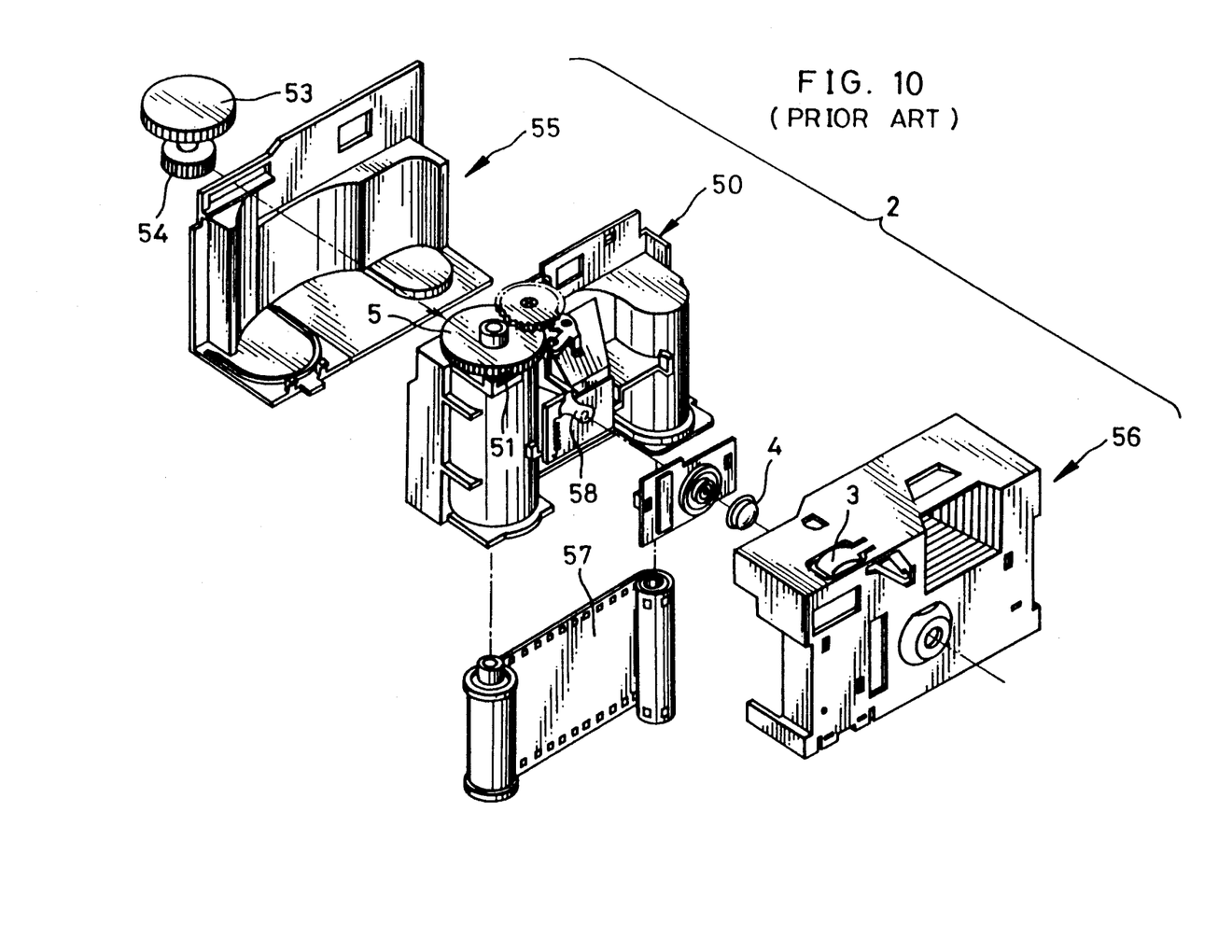
FIG. 10 is an exploded perspective view illustrating the film unit and housing dial of the prior art described above.

Referring to FIG. 10 illustrating a lens-fitted film unit 2 and a manually operable dial 53 of the conventional underwater housing, a wind-up dial 5 as described above is mounted on a main body 50 of a film unit, on which a rear cover 55 and a front cover 56 are fixed. Reference numeral 58 designates a shutter blade. A reverse-rotation-preventing claw 51 is formed integrally with the main body 50 on its front side, and resiliently engages with a tooth of the wind-up dial 5, so that the wind-up dial 5 is kept from rotating reversely to the direction of winding up photographic film 57. The film unit 2 is contained in a housing body (not shown) of the underwater housing so as to bring the film wind-up dial 5 into mesh with a coupling gear 54 fixed on the housing dial 53. The coupling gear 54 is in mesh with the back of the wind-up dial 5 so as to push the wind-up dial 5 toward the front to a degree within its backlash. This might deform the claw 51 toward the front destructively. When this film unit 2 is allowed to stand in a hot place e.g. in direct sunshine, such deformation will remain permanently in the claw 51 whereby the degree of mesh with the wind-up dial 5 will decrease. The photographic film 57 may therefore fail to be wound up properly.

Although the wind-up dial 5 is made of an inexpensive material having a comparatively low density e.g. polystyrene, yet the coupling gear 54 is made of an engineering plastic material of a high density. When the housing dial 53 is rotated with an excessively high torque applied inadvertently and in the wrong direction, the teeth of the wind-up dial 5 will be damaged or broken, whereupon the photographic film cannot be wound.

OBJECTS OF THE INVENTION

In view of the foregoing problems, an object of the present invention is to provide an underwater housing, and such housing in combination with an underwater taking camera, in which the manual operation of a dial on the housing can be performed in a manner similar to that of a wind-up dial of a camera when the camera is used without an underwater housing.

Another object of the present invention is to provide an underwater housing, and such a housing in combination with an underwater taking camera, in which a wind-up dial on the camera is prevented from being rotated by application of torque much greater than is sufficient for winding up the photographic film.

SUMMARY OF THE INVENTION

In order to achieve the above and other objects and advantages of this invention, an underwater housing is provided which carries a dial that is rotatable from outside the underwater housing; a rotary member rotates a wind-up dial of a camera in a first direction, the rotary member being coupled with a protruding portion of the wind-up dial within the underwater housing; and transmitting means transmits rotation of the housing dial to the rotary member, the transmitting means causing the rotary member to rotate in a second direction opposite to the first direction when the housing dial is rotated in the first direction. There is accordingly little possibility of rotating the housing dial in the wrong direction. The housing dial projects rearwardly to only a small extent from the housing body, so that the housing dial can have a rather large diameter.

In a preferred embodiment, reverse rotation preventing means prevents the housing dial from being rotated in the wrong direction. Furthermore, a cover is provided that covers at least a portion of the periphery of the housing dial, the cover preventing the housing dial from being pinched between the fingers so as to ensure application of a torque of no more than a predetermined value to the housing dial to rotate the same. The housing dial can thus receive a force only just adequate for winding up the film, without danger of breaking the film-advancing mechanism. There is thus no danger of deforming the reverse-rotation-preventing claw in the film unit, or of damaging the teeth of the wind-up dial on the film unit.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
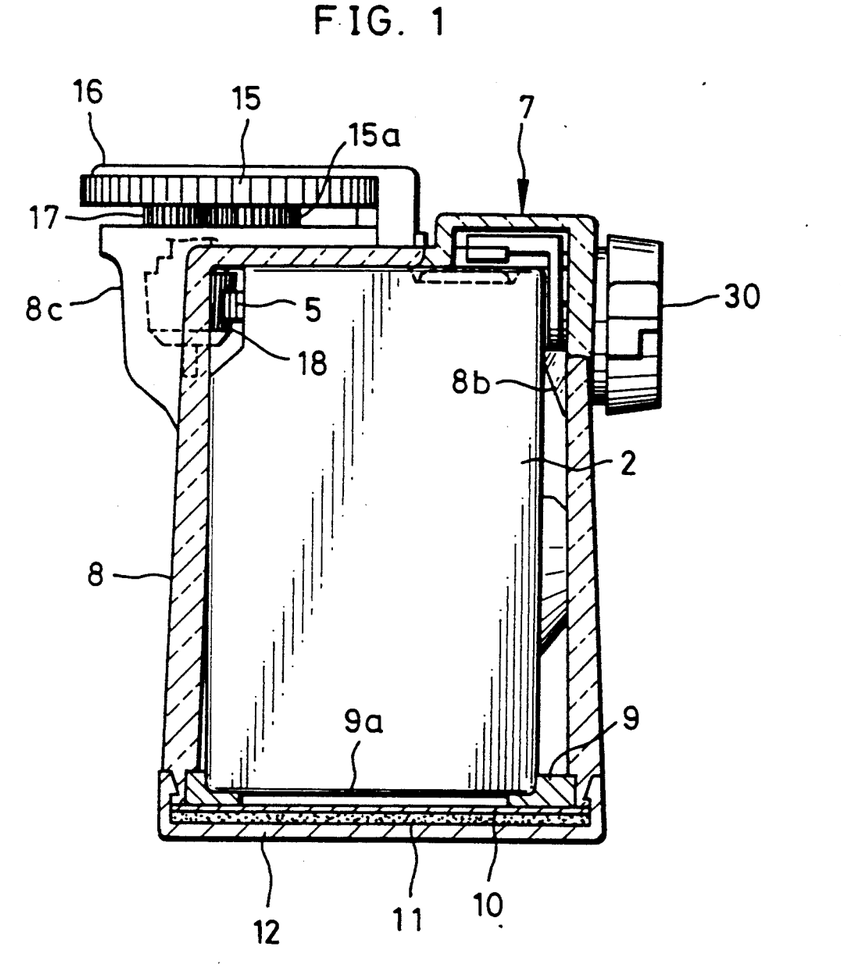
FIG. 1 is a cross sectional view of an underwater housing in accordance with the present invention, which housing contains a lens-fitted film unit.
Figure 2:
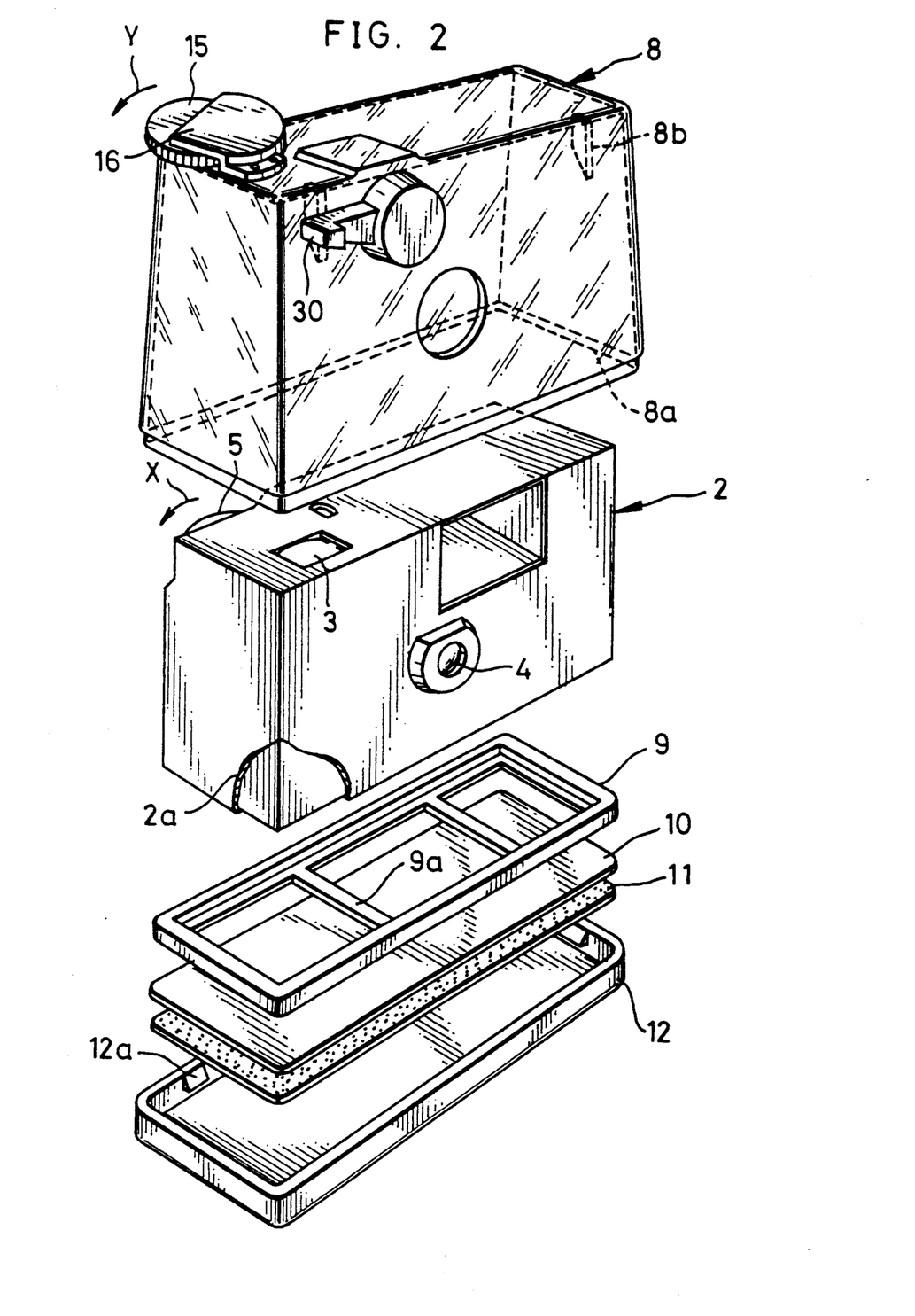
FIG. 2 is an exploded perspective view of the underwater housing and the film unit illustrated in FIG. 1.

In FIGS. 1 and 2 illustrating an underwater housing 7 in use with a lens-fitted film unit 2, the film unit initially contains a film cassette including a 35 mm photographic film (see FIG. 10). When a shutter button 3 is depressed, a photograph is taken via a taking lens 4, after which a film wind-up dial 5 is rotated in the direction of the arrow X to advance the photographic film by one frame. To increase the friction of the fingers with the wind-up dial 5 when operated, the periphery of the wind-up dial 5 is provided with teeth formed in the shape of a gear, which teeth also serve to be cause by a claw for preventing the dial from rotating reversely. The film unit 2 is covered by a carton 2a having suitably disposed openings. The basic structure of the film unit 2 is described in detail in Japanese Patent Publ. No. 2-32615 and Japanese Utility Model Laid-Open Publns. Nos. 1-128240 and 1-128241.

The underwater housing 7 is constituted of a transparent plastic housing body 8 having a bottom opening 8a and a plastic bottom lid 12 to be attached to the housing body 8 to close the bottom opening 8a. Between the housing body 8 and the bottom lid 12 are disposed a plastic positioning frame 9 to be fitted inside the opening 8a, a sheet 10 which is a watertight and moisture-proof lamination of aluminum foil together and plastic film, and a spacer sheet 11 formed from foamed plastic. With the film unit 2 inserted in the housing body 8 through the opening 8a, the frame 9 is fixed on the edge of the opening 8a.

Because the upper side of the frame 9 has recesses adapted to receive the bottom of the film unit 2, the frame 9 is so fixed that the bottom of the film unit 2 is correctly positioned in the housing body 8. On the inside of the housing body 8 are formed ridges 8b integral therewith, which ridges serve to position the upper portion of the film unit 2. On the frame 9 are formed two bridges 9a, which prevent deformation of the housing body 8, the watertight sheet 10 and the bottom lid 12 in the forward/backward direction as might otherwise be caused by a high water pressure. The watertight sheet 10 is heat-sealed onto the edge around the opening 8a so as to keep the inside of the underwater housing 7 watertight. A spacer sheet 1 for supplying additional thickness is fitted on the bottom of the watertight sheet 10. The bottom lid 12 is attached to the bottom of the housing body 8 by use of hooks 12a, so that the film unit 2 is fixed inside the underwater housing 7.

The aluminum foil constituting the watertight sheet 10 is impermeable to moisture for the purpose of preventing the photographic film from being degraded. The watertight sheet 10, however, may be made of a material other than aluminum foil, e.g. a moisture-proof plastic sheet having a thermowelding characteristic.

The portions of the housing body 8 overlying the taking lens 4 and a viewfinder are of lesser thickness than other portions of body 8, so as to improve transparency and avoid degradation in image quality. Reference numeral 8c designates a protuberant portion formed integrally with the housing body 8 so as to house a coupling gear 18 serving as an idler later to be described.

Figure 3:
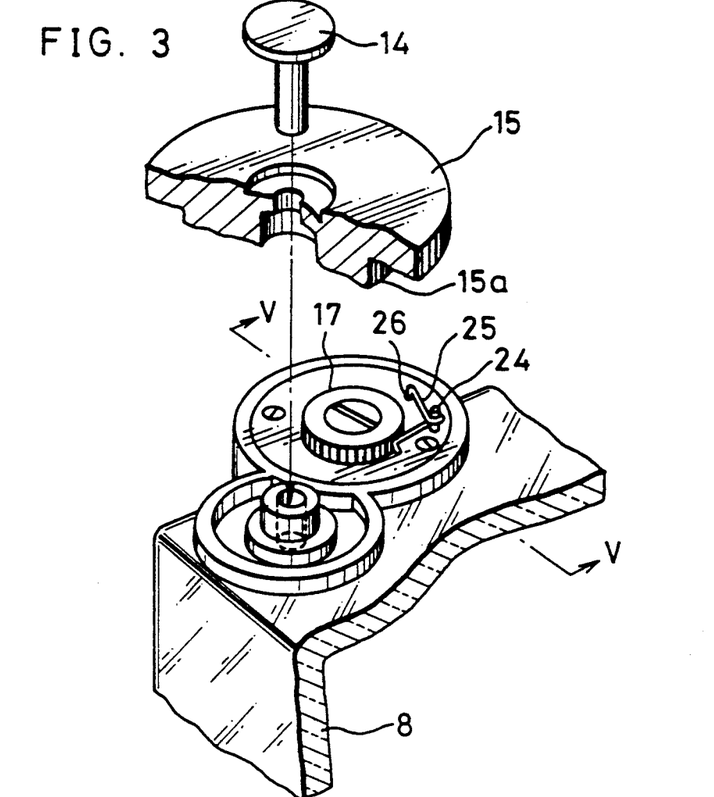
FIG. 3 is an exploded fragmentary perspective view illustrating a manually operable dial and a housing portion for mounting it.
Figure 4:
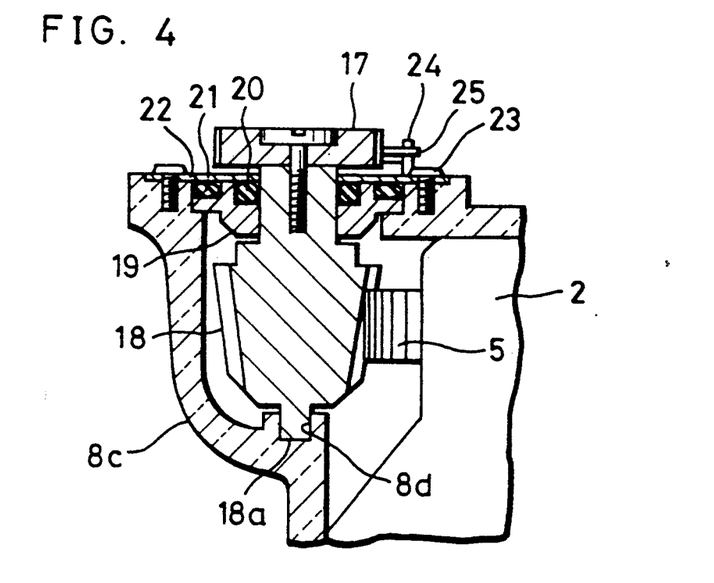
FIG. 4 is a fragmentary cross sectional view illustrating the same structure as FIG. 3, taken on line V—V in FIG. 3.

On the upper surface of the housing body 8 is disposed a manually operable dial 15 having a large diameter, rotatably supported on a shaft on the housing body 8. As illustrated in FIG. 3, a driving gear 15a is formed integrally with the housing dial 15 on its lower surface, and gear 15a is in mesh with a driven gear 17, also carried by body 8. A coupling gear 18 of progressively downwardly decreasing diameter is illustrated in FIG. 4, and gear 18 is also supported on a shaft on the housing body 8. The driven gear 17 is fixed on the coupling gear 18 by a screw, by may alternatively be formed integrally with the latter. The periphery of the housing dial 15 is provided with rather large projections and recesses arranged in a regular manner. The diameter of the dial 15 is larger than that of the driving gear 15a, and preferably is great enough to cover the driven gear 17.

A cover plate 16 partially covers the housing dial 15 and keeps the user from operating dial 15 by pinching it between his fingers. The diameter-decreasing shape of the coupling gear 18 makes it easy to engage the coupling gear 18 unfailingly with the teeth of the wind-up dial 5 when the film unit 2 is inserted in the case body 8 through the opening 8a.

A lower shaft 18a of the coupling gear 18 is received in a bearing recess 8d formed in the case body 8. An upper shaft o the coupling gear 18 is held in the case body 8 by means of a supporter 19, two rubber O-rings 20 and 21 fitted in two concentric annular recesses in the supporter 19, and a holding plate 22 for holding the supporter 19 and the O-rings 20 and 21 with pressure. In this construction, no water can enter the inside of the protuberant portion 8c from above the coupling ear 18, whilst the coupling gear 18 is held rotatably inside the protuberant portion 8c.

The holding plate 22 is fixed on the housing body 8 by screws 23, instead of which there may be provided caulking projections on the housing body 8, which projections may be deformed by caulking with eat with the holding plate 22 fitted thereon so that the plate 22 can never be detached. The housing dial 15 is mounted rotatably on the housing body 8 by a pin 14.

Close to the driven gear 17 is disposed a torsion coil spring 25 fixed on a pin 24. One end of the spring 25 is in contact with a tooth of the driven gear 17 while its other end is fixed in a stopping hole 26. The engagement of the first end of the spring 25 with the driven gear 17 allows the gear 17 with the coupling gear 18 to rotate clockwise or in the film wind-up direction, but prevents it from rotating in the opposite direction, that is, in the wrong direction.

Figure 5:
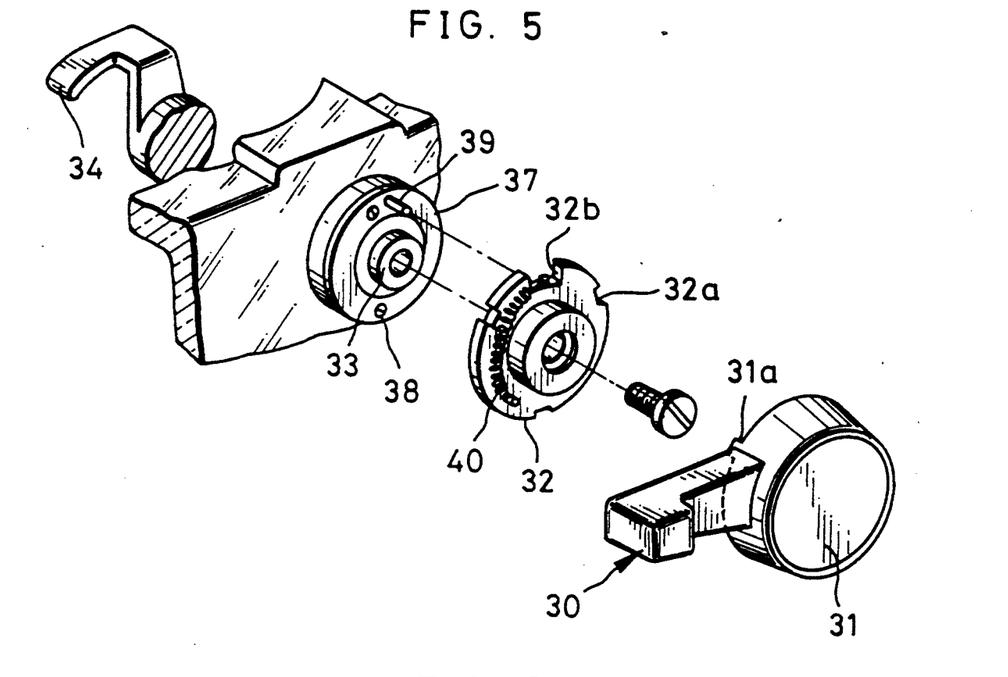
FIG. 5 is an exploded fragmentary perspective view illustrating a shutter release operating lever and a housing portion for mounting it.
Figure 6:
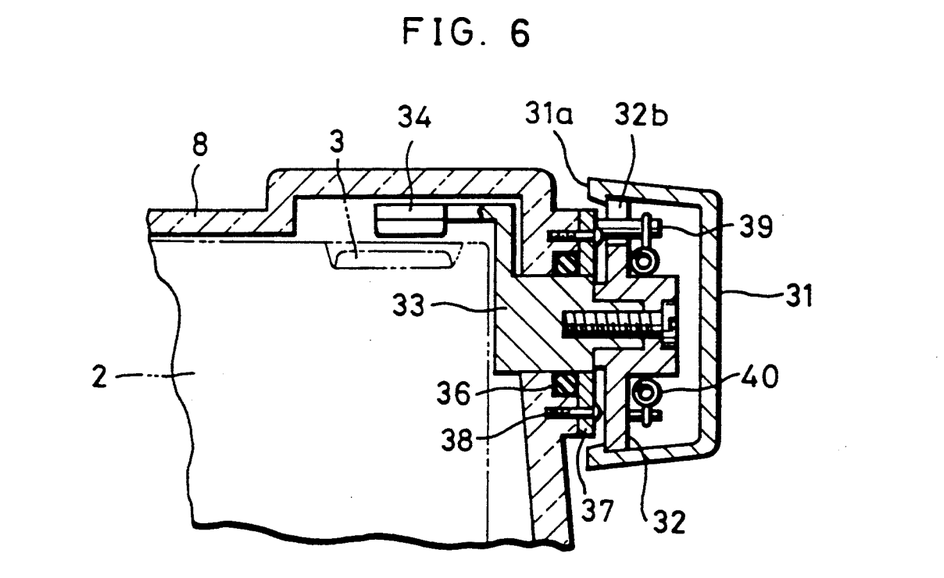
FIG. 6 is a fragmentary cross sectional view illustrating the same structure as FIG. 5.

On the front of the housing body 8 is disposed a manually operable shutter releasing lever 30, which is provided integrally with a cap portion 31, as illustrated in FIGS. 5 and 6. The cap portion 31 is securely fitted on a rotary disk 32 by means of engagement between hooks 31a of the cap portion 31 and recesses 32a in the rotary disk 32. The rotary disk 32 is secured by a screw to a rod 33 inserted through a hole in the housing body 8, so that pushing down on lever 30 causes the rod 33 to rotate counterclockwise. The rear end of the rod 33 is formed integrally with a push lever 43 in a crank shape. The distal end of the push lever 34 is situated in a position close to the surface of the shutter release button 3 when the film unit 2 is housed in the underwater housing 7.

The rod 33 is sealed and retained in the housing body 8 by an O-ring 36, a holding plate 37 and screws 38 so as to prevent water from entering the housing body 8 through the hole around the rod 33, without impeding rotation of the rod 33. On the supporting plate 37 is mounted a stopping pin 39, which projects toward the front through a recess 32b formed in the rotary disk 32. On the distal end of the pin 39 is fixed the upper end of a compression spring 40, of which the lower end is fixed on the rotary disk 32. The rotary disk 32 is thus biased clockwise. The contact between the pin 39 and the left edge of the recess 32b keeps the operable lever 30 held in its home position. The arc over which the lever 30 is movable is defined by the contact between the pin 39 and opposite edges of the recess 32b. Instead of the screws 38, pins may project from the housing body 8 and be used for fixing the holding plate 37 thereon by heat welding.

The operation of the shutter releasing mechanism will now be described. When the lever 30 is depressed, the rotary disk 32 is rotated together therewith counterclockwise against the bias of the tension spring 40. The rod 33 and thus the push lever 34 rotate counterclockwise to depress the release button 3, the shutter blades being opened and closed thereby. Upon releasing lever 30, the spring 40 causes the rotary disk 32 to rotate reversely so as to return the lever 30 to the home position as well as to raise the push lever 34.

After operating the shutter of the film unit 2, the mechanism for locking the wind-up dial 5 is unlocked so as to allow winding up the photographic film, in a manner well known and as disclosed in the above publications. To perform a film wind-up operation, the user applies his thumb to that portion of the periphery of the housing dial 15 that projects partially rearward and rotates dial 15 in the direction of the arrow Y in FIG. 2. The meshing of the driven gear 17 with the driving gear 15a causes the coupling gear 18 to rotate clockwise in FIG. 3. The wind-up dial 5 in mesh with the coupling gear 18 is rotated in the direction of the arrow X in FIG. 2. The photographic film is wound up by one frame, while a shutter charge mechanism (not shown) is operated to charge the shutter to stand by for taking another photograph.

Even when the reverse-rotation-preventing claw (illustrated in FIG. 10 with reference numeral 51) associated with the wind-up dial 5 is deformed too badly to operate appropriately, the torsion coil spring 25 provided on the underwater housing 7 serves to prevent the housing dial 15 from rotating in the reverse direction. The wind-up dial 5 is thereby kept from reversely rotating in the underwater housing 7. The photographic film is thus unfailingly transported in the correction, that is, the wind-up direction.

Another preferred embodiment of the present invention will now be described in connection with FIGS. 7-9. In the embodiment of FIGS. 1-6, there might be still appreciable backlash within the underwater housing 7, of the film unit 2 in its lengthwise direction. So in addition to decreasing the diameter of the coupling gear, there is the need of further structure for ensuring the engagement between the gear 18 and the wind-up dial 5.

Figure 7:
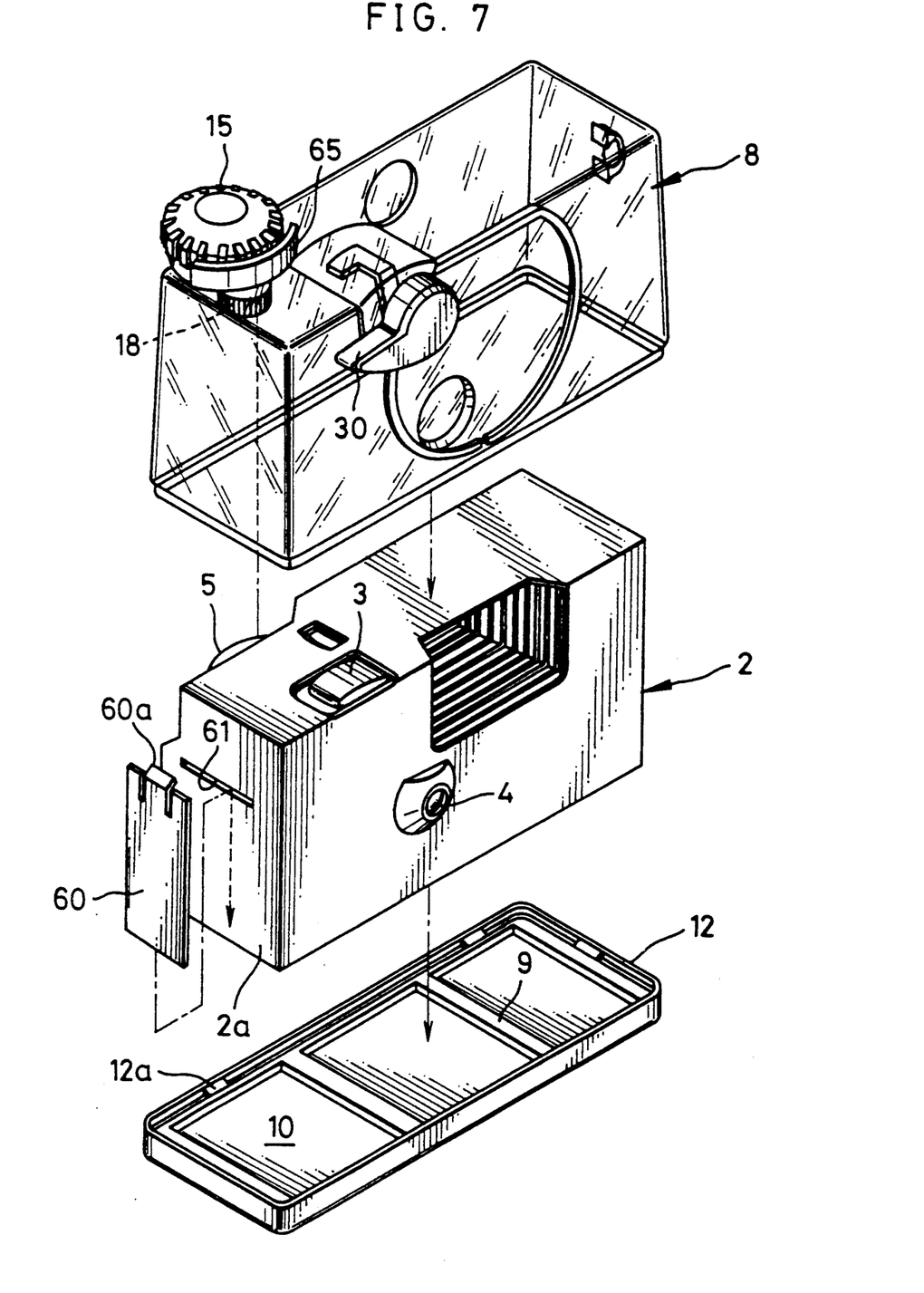
FIG. 7 is an exploded perspective view illustrating an underwater housing with the film unit in accordance with another preferred embodiment of the present invention.
Figure 8:
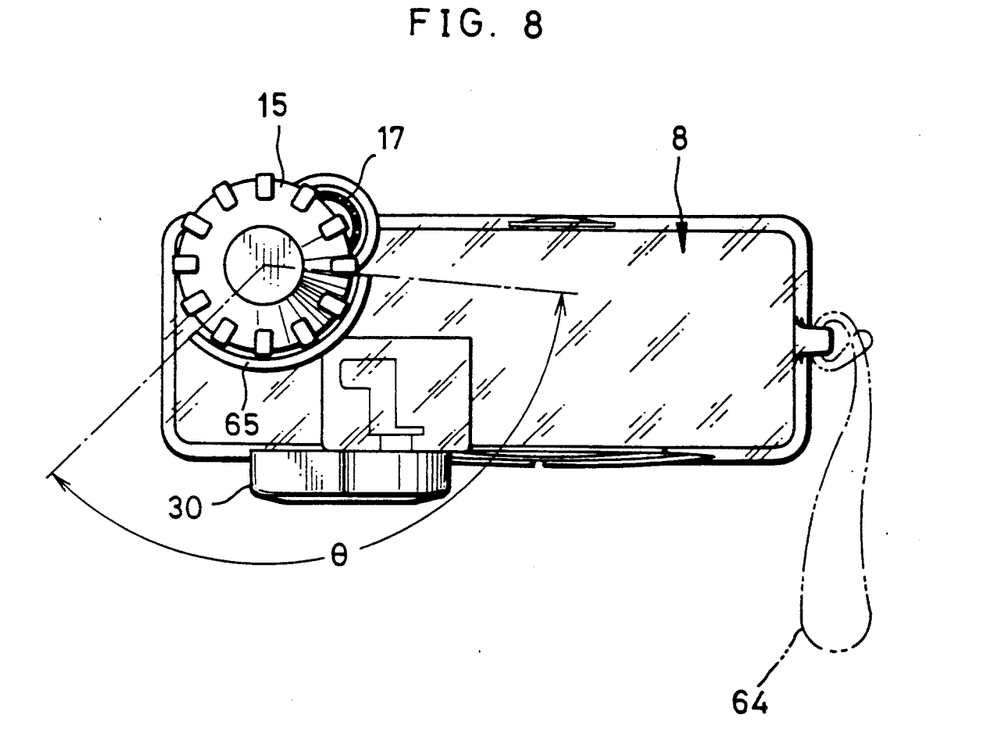
FIG. 8 is a top plan view illustrating a range of coverage of the housing dial by a ridge on the underwater housing illustrated in FIG. 7.
Figure 9:
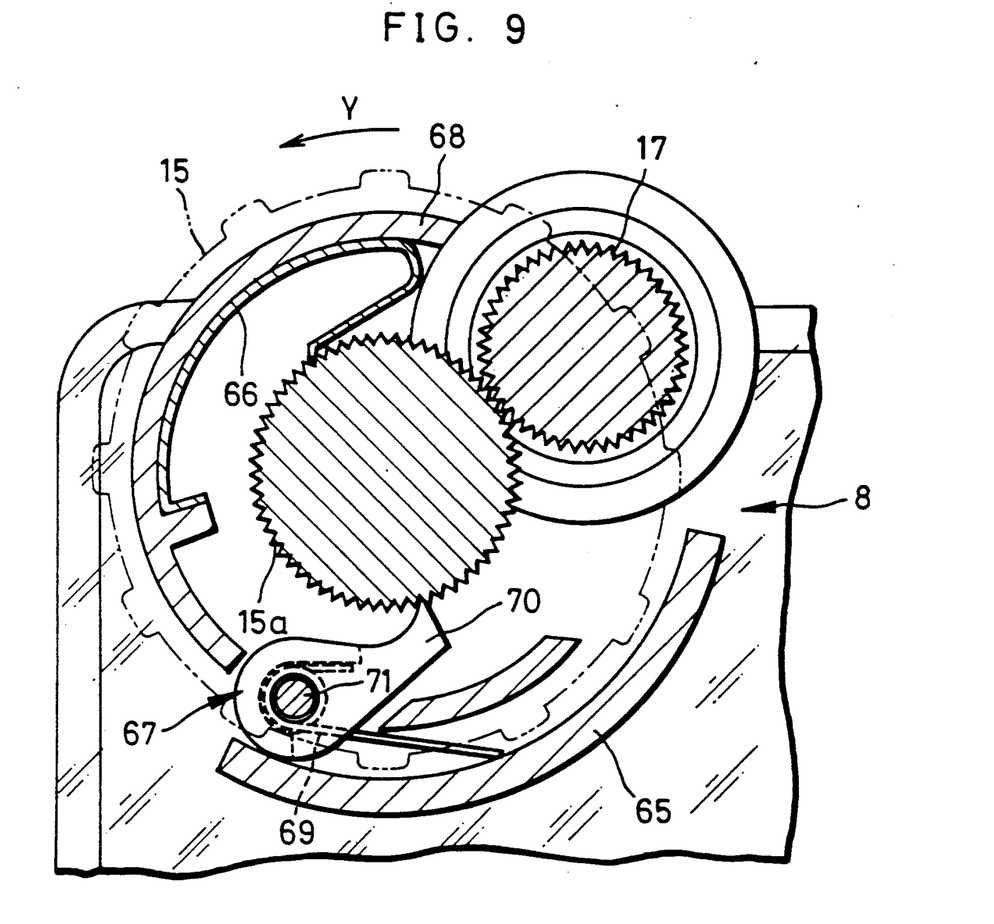
FIG. 9 is an enlarged fragmentary cross-sectional view illustrating the region where the housing dial is mounted.

In the embodiment of FIGS. 7-9, there is provided a leaf spring 60 for this purpose. The leaf spring 60 is made of an elastic and rigid material, inserted in a slit 61 formed in the carton 2a on the left lateral wall thereof. An upper, crooked end 60a is formed between two grooves formed in the leaf spring 60, which is fitted in the slit 61 with the crooked end 60a exposed. When the film unit 2 with the leaf spring 60 is incorporated in the housing body 8, the crooked end 60a biases the film unit 2 rightward within the housing body 8, so that the wind-up dial 5 is held reliably mesh with the coupling gear 18.

Instead of the cover plate 16 partially covering the housing dial 15 rearwardly and downwardly in the embodiment of FIGS. 1-6, the housing dial 15 may be partially covered about its periphery as illustrated in FIGS. 7 and 8, i.e. covered by an arcuate ridge 65 formed integrally with the housing body 8. The ridge 65 covers the housing dial 15 about an arc having a central angle θ of, say, 110° as seen in FIG. 8, from 110° to 180°. Similarly to the cover plate 16, the ridge 65 allows the user to press one of his fingers against the dial 15 but prevents him from pinching the dial 15 with the fingers. If the dial 15 were pinched, a torque as great as about 25 kg cm could be applied thereto, which is much more than is necessary. In the present invention, however, torque no greater than 5 kg cm is applied by one finger, so that the film wind-up mechanism is protected from being damaged by excessive torque.

It is to be noted that reference numeral 64 designates a rubber belt for tethering the housing 7 in order to prevent the user from losing it underwater.

Instead of the torsion coil spring 25 for preventing the coupling gear 17 from reversely rotating, there is provided in the embodiment of FIGS. 7-9 a reverse-rotation-preventing mechanism associated with the driving gear 15a. It is necessary for this mechanism to prevent reverse rotation even when a high torque is applied to the dial 15 in the wrong direction, because the dial 15 has such a diameter that a high torque can be applied by the user's thumb. Thus, as is illustrated in FIG. 9, the present embodiment is provided with a leaf spring 66 and a reverse rotation preventing mechanism 67. The proximal end of the leaf spring 66 is fixed on the inside of an annular ridge 68 projecting from the upper side of the housing body 8. The distal end of the leaf spring 66 is engaged with a tooth of the driving gear 15a so as to prevent the gear 15a from rotating in the direction reverse to the arrow Y. The mechanism 67 is constituted by a torsion coil spring 69 and a pawl 70, which are fixed on a shaft 71 secured to the housing body 8. The pawl 70 prevents the driving gear 15a from rotating in the direction reverse to the arrow Y, as does also the leaf spring 66.

Thanks to the provision of the cover plate 16 or the ridge 65, as described above, the operable dial 15 is reliably protected from being grasped manually, while at the same time the photographic film is unfailingly wound up. The wind-up mechanism will be subjected to no excessive or unnecessary force.

The present underwater housing is applicable, not only to a lens-fitted film unit or a single-use camera, but also to a reusable photographic camera having a film wind-up dial protruding to the rear or laterally.

Although the underwater housing according to the above embodiments is openable at its bottom, the present invention is also applicable to an underwater housing of which a rear side is openable, on which housing the idler gear mechanism having the coupling gear 18 and the driven gear 17 is provided in the same manner as in the above embodiments. Such a rear-side openable housing is convenient particularly for a camera or a lens-fitted film unit of which a rear wall is openable for unloading a photographic film, while the bottom-openable housing is naturally convenient for a camera or a film unit of which a bottom wall is openable.

The watertight structures of the bearings for supporting the shaft of the coupling gear 18 or the rod 33 can be changed or modified in various manners associated with the wind-up dial.

The coupling gear 18 is employed as the rotary member of the present invention. However, a wheel without teeth but having a high friction e.g. a rubber wheel may be used alternatively as the rotary member.

In the above embodiments, the lens-fitted film unit is factory-assembled in the underwater housing, and sold as an underwater taking camera commercially in the market. After the user has performed all exposures on the photographic film, he forwards the underwater camera to a photo laboratory without disassembly. A photofinisher disassembles the underwater camera, performs photofinishing, and returns the negative film as processed to the user together with photoprints as obtained by printing the negative film. The underwater housing as well as the lens-fitted film unit is discarded in the photo laboratory after disassembly.

Instead of selling the underwater housing together with the lens-fitted film unit, however, the underwater housing may be sold separately, in which case the user may insert a lens-fitted film unit before he conducts underwater photography.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An underwater housing for containing in a housing body in watertight fashion a camera having a wind-up dial of which one portion protrudes from a camera body, said wind-up dial causing a photographic film to advance by one frame when said wind-up dial is rotated in a first direction, said underwater housing comprising:
   a manually operable dial so disposed on said housing body as to be rotatable from outside said housing body;
   a rotary member for rotating said wind-up dial in said first direction, said rotary member being adapted to be coupled with said protruding portion of said wind-up dial within said housing body; and
   transmitting means for transmitting rotation of said manually operable dial to said rotary member, said transmitting means causing said rotary member to rotate in a second direction opposite to said first direction when said manually operable dial is rotated in said first direction.

2. An underwater housing as claimed in claim 1, wherein a periphery of said wind-up dial is provided with teeth formed in a regular arrangement.

3. An underwater housing as claimed in claim 2, wherein said rotary member is a first gear adapted to be engaged with said teeth of said wind-up dial.

4. An underwater housing as claimed in claim 3, wherein said housing body is in a shape of a box of which a bottom side is open so as to insert said camera therein, said housing body including transparent portions overlying at least a taking lens and a viewfinder of said camera; and
   said underwater housing further comprising bottom closing means for closing said bottom side of said housing body in watertight fashion.

5. An underwater housing as claimed in claim 1, further comprising reverse-rotation-preventing means for preventing said manually operable dial from being rotated in said second direction.

6. An underwater housing as claimed in claim 1, further comprising a cover for covering a portion of a periphery of said manually operable dial, said cover preventing said manually operable dial from being grasped between the fingers of a user so as to ensure application of a torque of no greater than a predetermined value to said manually operable dial.

7. An underwater housing as claimed in claim 1, wherein said manually operable dial is mounted on an upper side of said housing body such that a portion of said manually operable dial protrudes rearwardly from a rear side of said housing body.

8. An underwater housing as claimed in claim 7, wherein a rotary center of said manually operable dial is positioned forwardly of a rotary center of said first gear and close to a lateral side of said housing body.

9. An underwater housing as claimed in claim 7, wherein said transmitting means includes: a second gear formed on a lower surface of said manually operable dial integrally therewith; a third gear meshing with said second gear; a rotary shaft carrying said first and third gears; and a watertight structure by which said rotary shaft passes through a wall of said housing body in a rotatable and watertight manner.

10. An underwater housing as claimed in claim 9, wherein said rear side of said housing body has a protruding portion in which a lower end of said rotary shaft and said first gear are contained.

11. An underwater housing as claimed in claim 9, wherein said first gear decreases downwardly in diameter so as to engage well with said first gear when said camera is inserted in said housing body.

12. An underwater housing as claimed in claim 9, wherein said first gear is formed integrally with said rotary shaft, and said third gear is fixed on an upper end of said rotary shaft.

13. An underwater housing as claimed in claim 10, wherein said watertight structure comprises a hole formed in said upper side of said housing body in association with said protruding portion; a support disposed to close said hole; a plate fixed on said housing body for fixing said support; said support being provided with a bearing hole for supporting rotatably a portion defined between said first and third gears along said rotary shaft, an annular groove formed to surrounding said bearing hole, and an O-ring fitted in said annular groove and pressed by said plate.

14. An underwater housing as claimed in claim 4, wherein said closing means includes a watertight sheet for sealing said bottom side of said housing body in watertight fashion, and a bottom lid fitted on an outer periphery of a bottom edge of said housing body to cover said watertight sheet.

15. An underwater housing as claimed in claim 14, further comprising a frame member fitted on an inside of said bottom edge of said housing body for keeping said camera immovable within said housing body, and a spacer sheet disposed between said bottom lid and said watertight sheet for pressing said frame member against said housing body via said watertight sheet.

16. An underwater housing as claimed in claim 3, further comprising biasing means for biasing a said camera within said housing body in order to bring said wind-up dial into firm contact with said first gear.

17. An underwater housing as claimed in claim 16, wherein said biasing means is a leaf spring.

18. An underwater housing as claimed in claim 17, wherein said camera is encased in a carton, and said leaf spring is partially inserted into a slit formed in said carton for fitting said leaf spring on said carton.

19. An underwater housing for containing in watertight fashion a camera having a shutter button and a wind-up dial which one portion protrudes from a camera body and of which dial a periphery is provided with teeth formed in a regular arrangement, said wind-up dial causing a photographic film to advance by one frame when rotated in a first direction, said underwater housing comprising:
a housing body in a shape of a box of which one side is open so as to insert said camera therein, said housing body being wholly transparent;
closing means for closing said open side in watertight fashion;
a manually operable dial rotatably mounted on an upper side of said housing body such that a portion of said dial protrudes rearwardly from said housing body;
reverse-rotation-preventing means for preventing said dial from being rotated in a second direction opposite to said first direction;
a first gear for rotating said wind-up dial in said first direction, said first gear being coupled with said protruding portion of said wind-up dial within said housing body;
transmitting means for transmitting rotation of said manually operable dial to said first gear, said transmitting means causing said first gear to rotate in said second direction when said manually operable dial is rotated in said first direction; and
shutter button actuating means provided on said housing body for actuating said shutter button.

20. An underwater housing as claimed in claim 19, wherein said open side is a bottom side of said housing body.

21. An underwater housing as claimed in claim 19, wherein said camera is a single-use camera in which said photographic film is preloaded.

22. An underwater housing as claimed in claim 21, wherein said transmitting means includes: a second gear formed on a lower surface of said manually operable dial integrally therewith; a third gear meshing with said second gear; a rotary shaft provided with said first and third gears; and a watertight structure for fitting said rotary shaft in said housing body in a rotatable and watertight manner.

23. An underwater housing as claimed in claim 22, wherein said preventing means is a torsion coil spring of which a distal end is engaged with a tooth on the periphery of said third gear.

24. An underwater housing as claimed in claim 22, wherein said preventing means is a leaf spring of which a distal end is engaged with a tooth on the periphery of said second gear.

25. An underwater housing as claimed in claim 22, wherein said preventing means includes a pawl member for being engaged with a tooth on the periphery of said second gear, and a torsion coil spring for biasing said pawl member toward said second gear.

26. An underwater housing as claimed in claim 19, further comprising a cover for covering a portion of the periphery of said manually operable dial, said cover preventing said manually operable dial from being grasped between the fingers of a user so as to ensure application of a torque of no greater than a predetermined value to said manually operable dial.

27. An underwater housing as claimed in claim 26, wherein said cover projects from said housing body to a height substantially equal to the height of said manually operable dial so as to lie alongside a front portion of said periphery of said manually operable dial.

28. An underwater housing as claimed in claim 26, wherein said cover includes a portion lying alongside a front portion of said periphery of said manually operable dial and a portion covering partially an upper surface of said manually operable dial.

29. An underwater housing as claimed in claim 26, wherein a following condition is satisfied:

$$110° \leq \theta \leq 180°$$

wherein $\theta$ is a central angle of said portion covered by said cover around said manually operable dial.

30. An underwater housing as claimed in claim 19, wherein said closing means includes a watertight sheet for sealing an open bottom of said housing body in watertight fashion, and a bottom lid fitted on an outer periphery of a bottom edge of said housing body, and arrested on said housing body by engaging hooks.

31. An underwater housing as claimed in claim 30, further comprising a frame member fitted on an inside of said bottom edge of said housing body for keeping said camera immovable within said housing body, and a spacer sheet disposed between said bottom lid and said watertight sheet for pressing said frame member against said housing body via said watertight sheet.

32. An underwater housing as claimed in claim 19, wherein said shutter button actuating means includes:
a manually operable lever provided on a front side of said housing body, said manually operable lever being movable between a home position and a shutter release position;
a transmitting member for transmitting movement of said manually operable lever to said shutter button, said transmitting member comprising a rod fixed on said manually operable lever at a front end thereof and rotatably inserted through said housing body, and a push lever provided on a rear end of said rod, a free end of said push lever being positioned close to said shutter button so as to depress said shutter button.

33. An underwater housing as claimed in claim 32, further comprising a watertight structure provided with an O-ring for watertightly sealing around said rod.

34. An underwater housing as claimed in claim 32, further comprising a spring biasing said manually operable lever toward said home position.

35. An underwater taking camera comprising a camera and an underwater housing in combination;
said camera including:
A) a camera body preloaded with photographic film;
B) a wind-up dial for causing said photographic film to advance by one frame when rotated in a first direction after exposure, of which wind-up dial a periphery is provided with teeth formed in a regular arrangement, and one portion protrudes from said camera body; and
C) a shutter button on said camera body; said underwater housing including:
a) a housing body in a shape of a box of which one side is open so as to insert said camera therein, said housing body being wholly transparent;
b) closing means for closing said open side in watertight fashion and for keeping said camera in a watertight state in cooperation with said housing body;
c) a manually operable dial rotatably mounted on an upper side of said housing body with a portion of said manually operable dial protruding rearward from said housing body;
d) a first gear for rotating said wind-up dial in said first direction, said first gear being coupled with said protruding portion of said wind-up dial within said underwater housing;
e) transmitting means for transmitting rotation of said manually operable dial to said first gear, said transmitting means causing said first gear to rotate in a second direction opposite to said first direction when said manually operable dial is rotated in said first direction; and
f) means for actuating said shutter button.

36. An underwater taking camera as claimed in claim 35, wherein said open side is a bottom side of said housing body, and said closing means includes a watertight sheet for sealing said open side in watertight fashion and a bottom lid attached to said housing body to cover said watertight sheet.

37. An underwater taking camera as claimed in claim 35, wherein said transmitting means includes: a second gear formed on a lower surface of said manually operable dial integrally therewith; a third gear in mesh with said second gear; a rotary shaft provided with said first and third gears; and a watertight structure for fitting said rotary shaft in said housing body in rotatable and watertight manner.

38. An underwater taking camera as claimed in claim 35, further comprising reverse-rotation-preventing means for preventing said manually operable dial from being rotated in said second direction.

39. An underwater taking camera as claimed in claim 35, further comprising a cover for covering a portion of the periphery of said manually operable dial, said cover preventing said manually operable dial from being grasped between the fingers of the user so as to ensure application of a torque of no greater than a predetermined value to said manually operable dial.

40. An underwater taking camera as claimed in claim 35, further comprising a frame member fitted on an inside of a bottom edge of said housing body for keeping said camera immovable within said housing body, and a spacer sheet disposed between said bottom lid and said watertight sheet for pressing said frame member against said housing body via said watertight sheet.

41. An underwater taking camera as claimed in claim 35, further comprising biasing means for biasing said camera within said housing body in order to bring said wind-up dial into firm contact with said first gear.

42. An underwater taking camera as claimed in claim 35, wherein said shutter button actuating means comprises:
a manually operable lever provided on a front side of said housing body, said manually operable lever being movable between a home position and a shutter release position;
a spring biasing said manually operable lever toward said home position;
a transmitting member for transmitting movement of said manually operable lever to said shutter button, said transmitting member including a rod fixed on said manually operable lever at a front end thereof and rotatably inserted through said housing body, and a push lever provided on a rear end of said rod, a free end of said push lever being positioned close to said shutter button so as to depress said shutter button; and
a watertight structure provided with an O-ring for watertightly sealing around said rod.

* * * * *